Sept. 15, 1936.  R. F. EDGAR  2,054,672
FLUX METER
Filed Sept. 28, 1934
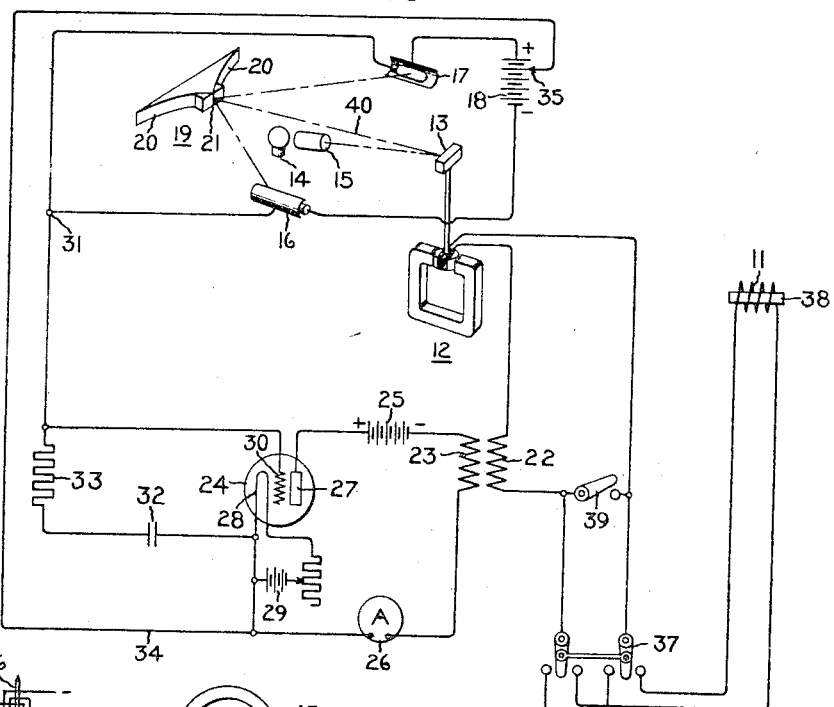
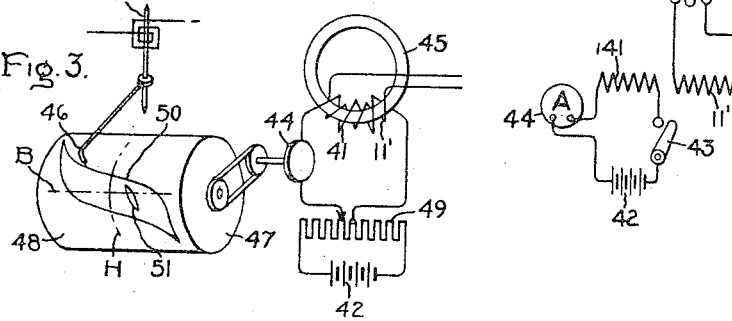
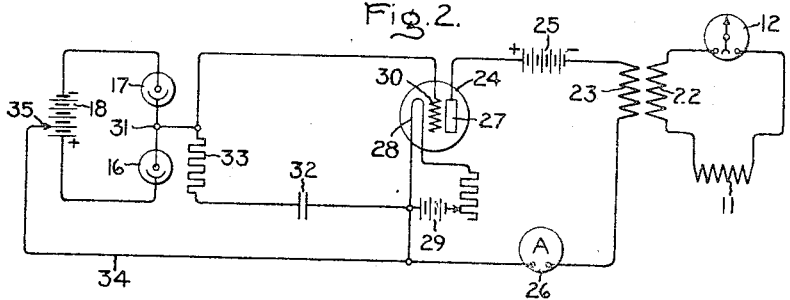
Inventor:
Robert F. Edgar,
by Harry E. Dunham
His Attorney.

Patented Sept. 15, 1936

2,054,672

UNITED STATES PATENT OFFICE 2,054,672

FLUX METER

Robert F. Edgar, Schenectady, N. Y., assignor to General Electric Company, a corporation of New York Application September 28, 1934, Serial No. 745,900

6 Claims. (Cl. 175—183)

My invention relates to magnetic measuring methods and appliances and concerns particularly apparatus and methods for measuring magnetic flux.

It is an object of my invention to provide a flux-measuring arrangement which is independent of the rapidity with which the flux test is made and which permits the use of high-torque measuring instruments for obtaining readings as well as permitting the amplification of measuring current to allow the use of recording instruments, telemeters, and the like in connection with the apparatus.

It is also an object of my invention to provide apparatus which is independent of the rate of flux change in an exploring coil and in which the indication remains substantially constant without drifting to zero after the flux change has been made.

Other and further objects and advantages will become apparent as the description proceeds.

In accordance with my invention in its preferred form, I utilize an exploring coil and a ballistic galvanometer, as in conventional flux-measuring apparatus heretofore employed, but I so arrange the apparatus that the ballistic galvanometer is not permitted to deflect perceptibly and the null method of measurement is employed, making the readings independent of any effect of the suspension of the ballistic galvanometer. The coil and the galvanometer are connected in series to the primary of a mutual inductance or transformer and an auxiliary current source is provided to supply current to the secondary winding of the mutual inductance in series with a current-responsive instrument from which the readings of flux are obtained.

A control arrangement is employed which may, if desired, take the form of a photo-electric follow-up system to control the current in the auxiliary circuit in response to the tendency of the ballistic galvanometer to deflect in response to current impulses therein produced by changes in flux in the exploring coil. The circuit control system is so arranged that the current in the auxiliary circuit increases or decreases to produce a current impulse and the primary of the mutual inductance serves to balance the current impulse produced by the change in flux and overcome the tendency of the ballistic galvanometer to deflect. The variation in continuous current in the control circuit then serves as a measure of flux.

The features of my invention which I believe to be novel and patentable will be pointed out in the claims appended hereto. A better understanding of my invention, itself, may be obtained by referring to the following description taken in connection with the accompanying drawing in which Fig. 1 is a schematic diagram of one embodiment of my apparatus showing the electrical circuit; Fig. 2 is a circuit diagram of the apparatus of Fig. 1 redrawn for the sake of clarity, and Fig. 3 is a diagram representing in part a modification of the embodiment of Fig. 1.

Referring now more in detail to the drawing in which like characters are used to designate like parts throughout, an exploring or search coil 11 is provided which may be subjected to the flux which is to be measured. There is also provided a ballistic galvanometer 12, that is, a galvanometer having a relatively large mechanical inertia and time constant and provided with only very weak biasing springs, if any. Ballistic galvanometers differ from other galvanometers or ordinary ammeters only in being constructed to have higher inertia of the moving element and lower resisting torque. However, for reasons to be explained hereinafter, high inertia is not actually requisite to satisfactory operation of my apparatus. The galvanometer 12 has a movable element carrying a mirror 13 which cooperates with a photo-electric control or follow-up system.

The photo-electric control system, which may be similar to that disclosed in Patent No. 1,897,550, LaPierre, consists of a light source 14, a system of focusing or condensing lenses 15, a pair of photo-electric tubes 16 and 17, a source of photo-tube current 18, and a beam-splitting arrangement 19. Preferably the photo-electric tubes are of the saturated type in which the current is independent of voltage above a certain point referred to as the saturation point in the current-voltage curve. A type of photoelectric tube which I have found to be satisfactory is described more in detail in United States Patent No. 1,927,792 to Charlton but I have used various types of tubes successfully. It will be understood that my invention is not limited to the use of tubes constructed in a particular manner. The beam-splitting arrangement 19 consists of a pair of mirror surfaces 20 at an angle to each other and preferably curved, and also, if desired, a pair of prisms 21 placed with incident faces in the same plane and reflecting faces at an angle to each other at the point where the curved mirror surfaces 20 would meet if extended toward each other, in order to provide a finer dividing line between the mirror surfaces. Preferably, however, a slight space is left between the adjacent edges of the mirror surfaces 20 if the prisms 21 are used.

A transformer or mutual inductance is provided having a primary winding 22 in series with the galvanometer 12 and the exploring coil 11, and having a secondary winding 23. The secondary winding 23 is connected in an auxiliary circuit controlled by the photo-electric control system referred to above. The auxiliary circuit may consist of a three-element discharge tube 24, a source of current 25, and a current-responsive device 26 connected as a plate ammeter or of any desired type connected in series in a plate circuit including the secondary winding 23 of the transformer. The photo-electric tubes 16 and 17 are connected in series to the photo-electric tube current source 18.

The discharge tube 24 has an anode 27 connected to the positive side of the current source 25 and a cathode 28 connected to the negative side. Suitable means are provided for heating the cathode 28 such as a source of current 29. The discharge tube 24 also has a control grid 30 connected to the common terminal 31 of photo-electric tubes 16 and 17 and preferably a condenser 32 and a resistor 33 are connected in series between the cathode 28 and the control grid 30. The discharge tube 24 may be of any of the well known types in which the plate current is controlled by the potential of the control grid, vacuum tubes being suitable and tubes having relatively high mutual conductance being advantageous.

In order to fix the potential of the photo-electric tube current source 18 with respect to the potential of the plate circuit of the tube 24, the connection 34 is provided between the cathode 28 and the movable tap 35 adjustably contacting a point in the current source 18.

In making measurements of flux, it is usual to make the measurement by observing the effect of a change in flux corresponding to the flux being measured. In order to adapt the apparatus to the various conditions of flux measurement, I provide alternative exploring coils 11 and 11' and a double-throw switch 37 to permit connecting either of the coils in circuit. If the switch 37 is one which may open the circuit of galvanometer 12 and transformer primary 22, it is important to provide a switch 39 for closing this circuit during manipulation of switch 37 since otherwise control of galvanometer 12 through the auxiliary current source 25 and the transformer 23—22 would be lost and a measurement of flux might be begun without the galvanometer 12 in its optical neutral position.

It will be understood that suitable constants for the various elements of the apparatus will suggest themselves to those skilled in the art according to the constants of the equipment at hand and the magnitude of the fluxes to be measured. No particular relationship between the constants or dimensions of the elements employed is necessary other than that dictated by practical considerations of maximum output or efficient operating ranges of elements. For example, efficient utilization of apparatus would suggest using an ammeter 26 having a full scale reading approximately equal to the maximum permissible plate current of the discharge tube 24.

Although satisfactory operation may be obtained notwithstanding variations within wide limits of the values of the circuit constants, for the sake of illustration, I shall state certain specific values which I have found to produce successful operation. The battery 35 may be one producing 135 volts and the tubes 16 and 17 may be standard vacuum photoelectric tubes with corresponding voltage rating. The condenser 32 may have a capacity of 0.0006 microfarads, and the resistor 33 a resistance of 10 megohms. The galvanometer 13 may be a 100-ohm reflecting ballistic galvanometer of standard make. The ammeter 26 may be a milliammeter with a range of 0–100 milliamperes. The tube 24 may be a standard three-element vacuum tube rated at approximately 100 milliamperes plate current, 80 volts plate voltage and 2.5 volts filament, the battery 25 being an 80-volt battery and the battery 29 a 2.5-volt battery. A mutual inductor 22—23 providing $10^6$ to $10^7$ interlinkages per ampere may be used.

The operation of the apparatus will be explained in connection with the measurement of the flux produced by a permanent magnet 38. This flux may be measured either by passing the exploring coil 11 over the magnet 38 so as to cut the lines of flux produced thereby to produce an induced current impulse which may be measured, or the flux may be measured by starting with a magnet 38 within the coil 11 and withdrawing the magnet. For the sake of illustration, the operation will be described in connection with the latter method of measurement.

The switch 37 is first left open and the switch 39 is left closed to make sure that no inductive effects will take place in the galvanometer 12 before the flux measurement is begun. The exploring coil 11 is then placed in the desired position for the measurement to be made, in this case, around the magnet 38. Thereupon, the switch 37 is moved to the right-hand position connecting the exploring coil 11 in circuit with the galvanometer 12 and the transformer primary 22 and the switch 39 is opened. The magnet 38 is then withdrawn from the coil 11 and a current is induced in the exploring coil 11, producing a current impulse in the galvanometer 12 and the transformer primary 22.

The galvanometer 12 tends to deflect in one direction or the other depending upon the polarity of the current impulse and, in so doing, shifts the center of the light beam 40 slightly to one side or the other of the center of the beam-splitting arrangement 19, on which the beam is normally sharply focused. Consequently, the light balance between the photo-electric tubes 16 and 17 is upset and the current in one is decreased whereas the current in the other is increased causing an equalizing current to flow in the resistor 33. Nevertheless, the momentary deflection of the galvanometer 12 need not exceed an angle corresponding to a small fraction of the width of the light beam 40 and normally does not. The equalizing current increases or decreases the charge on condenser 32 causing its potential to rise or fall. Consequently, the potential of the grid 30 of discharge tube 24 also rises or falls and the magnitude of the current in the plate circuit of tube 24 increases or decreases, increasing or decreasing the mutual flux of windings 22 and 23, and producing a current impulse in the primary winding 22 of the transformer acting in opposition to the current impulse produced in the exploring coil 11. The increase or decrease in current continues until the induced current impulse in primary winding 22 is of sufficient magnitude to balance exactly the current impulse produced in exploring coil 11 by the changing flux to be measured and, consequently, the galvanometer 12 is either brought back to its zero position or is virtually prevented from deflecting. In practice, it is found that only a momentary deflection of a small amplitude is produced even in case of very rapid changes in flux. Since the increase or decrease of current in the plate circuit of the tube 24 depends upon the strength of the current impulse produced in the galvanometer 12, it follows that the increase or decrease of current measured by the instrument 26 provides a measure of the change in flux in the exploring coil 11. By reading the ammeter 26 before and after withdrawing the magnet 38 from the coil 11 and taking the difference in the readings, a measure is obtained of the flux produced by the magnet 11. The instrument 26 may, of course, have a scale calibrated directly in terms of flux or a multiplying constant may be used, determined by the constants of the apparatus and the number of turns of the exploring coil 11.

Since the galvanometer 12 is used substantially as a null instrument, its operation is independent of the character of its suspension and there is no tendency for the readings to be lost by the drift of the ballistic galvanometer back to zero. For this reason, the flux measurement may be made as slowly or as rapidly as desired. Even if the measurement is made very slowly by withdrawing the magnet 38 from the exploring coil 11 very slowly, the accuracy of the measurement will not be impaired since the operation of the ballistic galvanometer as arranged in my apparatus is not dependent upon the application of the current as a very short impulse. Conversely, high inertia is not required in the galvanometer 12.

When the ordinary deflection method of measurement is used with a ballistic galvanometer, it is obviously necessary that the current impulse be very short in duration or that the ballistic galvanometer have very high inertia in order that the entire effect of the current impulse will be applied before the galvanometer has deflected appreciably and most certainly before the galvanometer has begun to drift back from its maximum position. In my apparatus this necessity is not present since the ballistic galvanometer is used as a null instrument.

It will be understood that if the ballistic galvanometer 12 is provided with biasing springs or a spring suspension, the instrument will be adjusted to have its mechanical neutral position correspond to the position at which the beam 40 impinges on the dividing line between prisms 21 and the light of beam 40 is divided evenly between photo-tubes 16 and 17. Although, for measurement of rapid-flux changes, the presence of a neutral biasing arrangement for the ballistic galvanometer 12 is relatively unimportant, it is preferable to have the ballistic galvanometer biased to a neutral position for measurements where flux changes slowly.

The manner of using the apparatus for other types of flux measurement will be readily apparent to those skilled in the art. For instance, in measuring the inductance of, or the flux produced by, a winding 41 fed by a source of current 42 of a predetermined strength, the exploring coil 11' and the winding 41 are brought into inductive relation. After the switch 37 has been moved to the left and the switch 39 has been opened, the instrument 26 is read. Then the circuit of the winding 41 is made or broken as desired by means of the switch 43 and the instrument 26 is again read, the difference in the two readings being proportional to the flux of the winding 41. If the circuit of winding 41 is arranged to permit reversing the current therein, as is well known in other testing arrangements, the measurement obtained is, of course, divided by two in order to obtain the correct value of the flux measured. An instrument 44 responsive to the magnetizing current in winding 41 may be provided to make possible comparisons between field strength and flux density.

If desired, both instruments 26 and 44 may take the form of recording instruments or the cooperating windings of a two-dimensional recorder for drawing magnetization curves and hysteresis loops. For example, in Fig. 3, the magnetizing winding 41 and the detector or exploring coil 11' are in inductive relation with a sample of magnetic material to be tested, such as a ring sample, 45. The flux-responsive instrument 26 is provided with a curve-drawing stylus or pen 46. The magnetizing current ammeter 44 has its movable element mechanically connected to a revoluble drum 47 carrying a sheet of record chart 48, cooperating with the pen 46 of the instrument 26. In consequence, the pen 46 deflects axially with respect to the drum 47 in accordance with flux changes and the drum 47 rotates a portion of a revolution about its axis in response to variations in magnetizing current. Accordingly, the pen may be caused to trace a curve of flux against magnetizing current or a magnetization curve by varying the current in the magnetizing winding 41, for which purpose a rheostat or a reversible polarity potentiometer 49 may be provided.

The apparatus of Fig. 3 is valuable for obtaining hysteresis curves as the complete hysteresis loop 50 can be traced by carrying the ring specimen 45 through a single cycle by means of the polarity reversing potentiometer 49. It will be understood that distances along the B-axis represent flux and distances along the H-axis represent magnetizing current. My invention is equally convenient for tracing displaced hysteresis loops such as the loop 51.

In accordance with the provisions of the patent statutes, I have described the principle of operation of my invention together with the apparatus which I now consider to represent the best embodiment thereof, but I desire to have it understood that the apparatus shown is only illustrative and that the invention may be carried by other means.

What I claim as new and desire to secure by Letters Patent of the United States, is:—

1. A flux meter comprising in combination, a galvanometer having a movable element carrying a mirror, a source of light directing a beam upon said mirror, a beam-splitting device cooperating with a beam reflected from said mirror, a pair of photo-electric tubes cooperating with said beam-splitting device on either side thereof, a source of photo-tube current energizing said photo-tubes in series, a discharge tube having an anode, a cathode, and a control grid, a source of anode current, a condenser and a resistor connected in series between said control grid and said cathode, a current-responsive instrument, a transformer having a primary winding and having a secondary winding connected in the anode circuit of said discharge tube in series with said source of anode current and said current-responsive instrument, an exploring coil connected in series with said galvanometer and the primary winding of said transformer, the common terminal of said photo-electric tubes being connected to the control grid of said discharge tube and the cathode of said discharge tube being connected to a point in the photo-tube current supply means, said photo-electric tubes and said beam-splitting device being so arranged that said photo-electric tubes are equally illuminated when said galvanometer is in its zero position, thus causing equal currents to flow therein when the galvanometer is in its zero position, one of said photo-tubes becoming more intensely illuminated causing the current therein to increase when said galvanometer is deflected from said zero position by a current impulse induced in said exploring coil, whereby the grid potential of said discharge tube is varied, the anode current flowing in said transformer secondary is varied, and a current impulse is produced in said transformer primary which opposes the impulse induced in said exploring coil, restoring said galvanometer to its zero position and restoring equilibrium in current flow through said photo-electric tubes.

2. A flux meter comprising in combination, a ballistic galvanometer having a zero position, an exploring coil and a transformer primary winding, all connected in series, a source of current, a current-responsive instrument and a transformer secondary winding also connected in series, said transformer windings being in inductive relation, current controlling means for increasing or decreasing the current in said second circuit in response to positive or negative deflections of said ballistic galvanometer, whereby a change of flux through said exploring coil produces a current impulse tending to deflect said galvanometer and said current-controlling means varies the strength of current in said second circuit to produce a current impulse of opposite polarity in said ballistic galvanometer circuit, whereby said galvanometer is restored to its original position and the change in current in said second circuit serves as a measure of the change in flux in said exploring coil.

3. A flux meter comprising in combination, a ballistic galvanometer, an exploring coil in circuit therewith, whereby a change of flux threading said coil induces a current impulse therein and tends to deflect said galvanometer, means responsive to deflection of said galvanometer for inducing a current impulse of opposite polarity in said galvanometer circuit of the required magnitude to restore said ballistic galvanometer to its substantially undeflected position, and measuring means providing an indication varying in accordance with the magnitude of said opposite polarity current impulse.

4. A flux meter comprising in combination, a ballistic galvanometer, an exploring coil in circuit therewith, whereby a change of flux threading said coil induces a current impulse therein and tends to deflect said galvanometer, variable condition means controlled by the tendency of said galvanometer to deflect for maintaining it in its substantially undeflected position, and a measuring device responsive to the condition of said latter means, whereby indications of the change of flux in said exploring coil may be obtained.

5. A method of measuring the change in flux threading an exploring coil which comprises inductively relating the circuit of said exploring coil to a circuit carrying a continuous direct current, varying the current in said latter circuit to induce a current impulse in the exploring circuit of such a magnitude as to balance the current impulse induced in the exploring coil by the flux change to be measured, and determining the change in strength of the continuous direct current.

6. In a light balance controlling device, the combination of a source of light, a movable mirror in the path of light from said light source, a pair of mirrors having reflecting surfaces forming obtuse angles with a null line intersecting said movable mirror, a pair of prisms meeting at common edges, each having a surface in a plane perpendicular to said null line, and each having a surface lying substantially along one of said pair of obtusely positioned mirror surfaces, a pair of photoelectric tubes on either side of said null line, and means responsive to unequal illumination of said photoelectric tubes for moving said mirror toward a position in which it reflects said beam along said null line.

ROBERT F. EDGAR.